| United States Patent [19] | [11] | 4,132,655 |
|---|---|---|
| Draganov | [45] | Jan. 2, 1979 |

[54] FIRE-RETARDANT COMPOSITION AND METHOD OF RENDERING CELLULOSIC MATERIALS FIRE-RETARDANT

[76] Inventor: Samuel M. Draganov, 17966 Orange Tree La., Tustin, Calif. 92680

[21] Appl. No.: 860,179

[22] Filed: Dec. 13, 1977

[51] Int. Cl.$^2$ .............................................. C09K 3/28
[52] U.S. Cl. ................................ 252/8.1; 106/15 FP; 252/2
[58] Field of Search ...................... 106/15 FP; 252/8.1

[56] References Cited

U.S. PATENT DOCUMENTS

| 3,897,387 | 7/1975 | O'Shaughnessy | 252/8.1 X |
| 4,063,003 | 12/1977 | Hartman | 252/8.1 X |
| 4,076,871 | 2/1978 | Short et al. | 252/8.1 X |

*Primary Examiner*—Leland A. Sebastian
*Attorney, Agent, or Firm*—Mallinckrodt & Mallinckrodt

[57] ABSTRACT

The fire-retardant composition of U.S. Pat. No. 3,983,040 is improved to a surprising extent by the addition thereto of from about 10% to about 40% by weight of ammonium sulfate. In producing the improved composition, the patented composition is first made by reacting a pulverized borate ore selected from the group consisting of calcium, sodium, magnesium, and potassium borates and mixtures thereof, with sulfuric acid and water for a time sufficient to produce a substantially dry reaction product containing a boric acid constituent and a sulfate constituent. After drying, the reaction product is pulverized and the ammonium sulfate, also in pulverized condition, is intimately mixed therewith, or the two may be pulverized together to produce the final improved product. Cellulosic material is rendered fire-retardant by application of the product thereto.

10 Claims, No Drawings

FIRE-RETARDANT COMPOSITION AND METHOD OF RENDERING CELLULOSIC MATERIALS FIRE-RETARDANT

BACKGROUND OF THE INVENTION

1. Field

The invention is in the field of fire-retardant compositions of matter, particularly those useful for treating cellulosic materials such as cotton batting and ground waste paper insulation.

2. State of the Art

Boric acid in powder form has long been used as a fire retardant for cellulosic materials of the type with which this invention is particularly concerned. My prior invention disclosed by U.S. Pat. No. 3,983,040 as issued Sept. 28, 1976, under the title "Fire-Retardant Composition and Process of Producing Same", provided an effective and relatively economical substitute for the boric acid previously employed, although only about 80% as effective by weight. The fire-retardant composition of that invention comprises a particulate reaction product of a borate ore and sulfuric acid, the ore having been selected from the group consisting of calcium, sodium, magnesium, and potassium borates, and mixtures thereof. The reaction product contains boric acid and a significant quantity of one or more sulfates selected from the group consisting of calcium, sodium, magnesium, and potassium sulfates. The ore is preferably finely ground prior to the application thereto of the acid, and water is added during mixing of the ore and acid. Heat produced exothermically during the mixing aids in drying the reaction product, whereupon it is pulverized to a fine powder ready for use.

OBJECTIVE

In the making of the present invention, a principal objective was to increase the fire-retardant effectiveness of my previous composition to substantially that of boric acid.

SUMMARY OF THE INVENTION

In accordance with the present invention, I have succeeded in attaining and even exceeding that objective.

The reaction product of my aforesaid U.S. Pat. No. 3,983,040 is further processed by the addition thereto of from about 10% to about 40% by weight of ammonium sulfate. These ingredients may be ground to pulverized condition, either separately or together. If separately, they are intimately mixed thereafter to provide a dry powder, which constitutes the improved fire-retardant composition of this invention.

Although ammonium sulfate, by itself, is not a very effective flame retardant and has been used in the past as a diluant for various flame-retardant compositions, I have found that there is a pronounced and advantageous synergistic reaction with the composition of my previous invention, which renders the resultant composition surprisingly more effective against both flame spread and smolder. Thus, whereas my previous composition is approximately 80% as effective as boric acid for the same weight applied to a cellulosic material to be rendered fire-retardant, my present composition is rendered fully comparable to boric acid in effectiveness on an equivalent weight basis and even superior thereto at elevated temperatures, e.g. 140° F. as well as in the lower ranges of loading of insulation therewith.

That this is truly remarkable is shown by the fact that the addition of the same amount (e.g. 20% by weight) of pure boric acid to my previous composition yields only a small increase in flame retardancy and that a similar addition of ammonium phosphate (considered in the art as an extremely good flame retardant alone or in combination) actually has a negative effect on my previous composition. Moreover, ammonium sulfate by itself is known to be conducive to severe smoldering, while boric acid is known to greatly inhibit smoldering.

DETAILED DESCRIPTION OF BEST MODE

Although the addition of ammonium sulfate to my previously patented composition in quantity of from about 10% to about 40% by weight is effective to prevent or greatly inhibit smoldering, it is preferred to utilize from about 15% to about 25%. When the addition is below about 10%, the effect is insufficient to warrant the addition, and, although smoldering is inhibited up to an ammonium sulfate content of 40%, above a 40% content smoldering increases and is severe at a content of about 50% when used at a loading of 20% by weight with the cellulosic insulation material to be made fire retardant.

The composition thus far described is corrosive, which may be undesirable in many instances. Accordingly, it is wise to exercise pH control to reduce acidity to or about neutral or to even adjust the pH slighty on the alkaline side by appropriate additions of an alkaline material, such as lime, borax, calcium carbonate, etc. Also, it may be desirable to add a corrosion inhibitor, which may be of one or more known types for particular metals concerned, e.g. a sodium silicate, which will inhibit corrosion of steel, aluminum, and copper. Various other corrosion inhibitors are known and can be used alone or in combination, without detriment to the composition of the invention since the inhibitors are employed only in relatively small quantities.

Loading of the cellulosic material to be made fire-retardant will vary in accordance with code requirements in given areas of use. Normally, loading of cotton batting is about 10% by weight and loading of ground waste paper insulation is from about 15% to 30% by weight. It should be borne in mind that high loadings are undesirable, in that they increase density of the insulation material to which the fire-retardant composition is applied and reduce its insulating properties. Unfortunately, flame retardants do not behave in a linear manner. Diminishing returns are experienced the more that is used, so that a composition of low effectiveness must be used in undesirable quantities to satisfy code requirements. It can be recognized, therefore, that the more effective the composition, the less loading required and the better the final insulation product. Thus, the importance of the present invention.

Typical examples follow:

EXAMPLE 1

A sample of the fire-retardant composition of this invention was produced by first preparing a composition in accordance with my afore-referred-to U.S. Pat. No. 3,983,040, wherein the reaction product was shown to contain 40% boric acid. This composition was ground to minus 200 mesh, U.S. standard sieve, and was intimately mixed with sufficient minus 200 mesh ammonium sulfate to produce a final composition containing 80% by weight of the previously patented composition and 20% by weight of the ammonium sulfate.

When tested for both flame spread and smolder at ambient temperature of 72° F. in comparison with powdered boric acid, both being applied to equivalent samples of ground waste paper insulation at respective loadings of 25% by weight, the results were identical.

EXAMPLE 2

Similar comparative tests were carried out employing a similar fire-retardant composition of the invention in which the reaction product of the patent was ground with crystalline ammonium sulfate to yield a minus 200 mesh powder. The loadings for the respective tests were 20% by weight of the insulation material. Smolder resistance was found to be equal, but resistance to flame spread was superior for the composition of the invention to that obtained by the use of boric acid.

EXAMPLE 3

In comparative tests similar to those of Example 1 in which the composition of the invention contained 30% by weight of ammonium sulfate and its loading on the insulation was 20% by weight in comparison with a 25% by weight loading of the boric acid, resistance to flame spread was superior for the composition of the invention and smolder resistance was about equal.

EXAMPLE 4

When the composition of the invention was prepared as in Example 1, but utilizing enough of the ammonium sulfate to constitute 50% by weight and at a loading of 20% by weight on the insulation material, resistance to flame spread was very good, but smolder was so bad that the insulation was consumed.

EXAMPLE 5

A sample of a fire-retardant composition was prepared as in Example 1, but using, instead of ammonium sulfate, the same amount of boric acid as an additive. The total boric acid content was therefore 60%, rather than the 40% of Example 1. This composition was loaded on insulation material to the extent of 25% by weight and was tested in comparison with a similar loading of the fire-retardant composition of the present invention prepared as in Example 1. Both tests showed good smolder resistance, but the one utilizing the composition of this invention showed superior flame spread resistance. It was noted that the addition of boric acid to the composition of my aforesaid patent resulted in only a slight improvement in the performance of that composition.

All of the above tests for flame spread were carried out on a loose fill basis involving maceration and mixing of the insulation in a "Waring" blender and application thereof, by random scattering, onto a wire rack fabricated from ½ inch hardward cloth and measuring 5" × 14", with spikes of wire rising vertically therefrom and a flange of the same hardware cloth near one end to hold a one to two-inch depth of the fluffed insulation when the filled rack was inclined at an angle of 45° to increase the possibility of flame spread. With the rack so inclined, the flame from a Bunsen burner was applied at the lowest portion of the insulation, as well as at several locations upwardly therefrom. The tendency to spread flame was noted at each point of application of the flame.

The smolder tests were performed separately. For each test, twenty grams of the fire-retardant insulation were placed in a long rectangular form to a density of three lbs. per cu. ft. The resulting brick of insulation was then removed and placed on the same wire rack on which the flame tests were performed. The flame from a Bunsen burner was applied to the lower top edge of the block for a period of thirty seconds. At the end of this time, the flame was removed and smoldering was timed by a stop-watch. Insulation in which smoldering ceased immediately was termed "good". Otherwise, the insulation was graded at fifteen second intervals up to the extinguishing point. If smoldering continued beyond one minute, the insulation would usually be consumed and would be considered to have failed.

The following tests are examples of failure:

EXAMPLE 6

A sample of a fire-retardant composition was prepared as in Example 1, but utilizing powdered diammonium phosphate as an addition in place of powdered ammonium sulfate. The composition was incorporated in insulation and tested as in Example 1, but failed both flame spread and smolder tests. Such insulation would be hazardous.

EXAMPLE 7

A sample of a fire-retardant composition, again prepared as in Example 1 but utilizing powdered monoammonium phosphate in place of the ammonium sulfate, was incorporated in insulation and tested as in Example 1. The insulation failed both flame spread and smolder tests. Such insulation would be hazardous. Testing of insulation is usually done at ambient temperature of about 72° F. and relative humidity of 40%. However, this is not realistic for cellulose insulation blown into the attics of homes. Such attics can become extremely hot on summer afternoons in temperate climates and remain at elevated temperatures of 130 to 140° F. and higher for a number of hours. Due to moisture equilibrium of cellulose fibers, such fibers tend to lose moisture at these higher temperatures and are more susceptible to flame spread.

We therefore conducted a test as follows:

EXAMPLE 8

A composition sample in accordance with the invention was prepared and incorporated into a sample of insulation as in Example 1, but at a loading of 30%. It and a corresponding sample of insulation incorporating only boric acid were then kept for a period of two hours in an environment that was maintained at 130° F. They were then tested for flame spread. The sample containing only powdered boric acid was on the borderline of failure. The sample containing the composition of the present invention showed excellent resistance to flame spread.

A typical formulation for the composition of the present invention is as follows:

| Ingredient | Weight in Lbs. |
| --- | --- |
| Composition of Draganov U.S. Pat. No. 3,983,040 | 1,413 |
| Ammonium Sulfate | 400 |
| Hydrated Lime | 174 |
| Corrosion Inhibitors | 13 |
| TOTAL | 2,000 |

In rendering cellulosic material fire-retardant, the dry powder composition is applied by dusting thereonto, as with cotton batting, or by mixing intimately therewith, as with ground waste paper insulation material that is normally installed by blowing into attics, between interior and exterior walls, etc.

Whereas specific examples are set forth herein in describing the invention, it should be understood that the invention is not limited thereto and that changes may be made within the scope of the generic teachings hereof and the claims that follow.

I claim:

1. An improved fire-retardant composition of matter for cellulosic material, comprising a mixture containing, as the principal ingredient, a reaction product of sulfuric acid and a borate ore, the latter being selected from the group consisting of calcium, sodium, magnesium, and potassium borates and mixtures thereof, said reaction product containing boric acid and a significant quantity of one or more sulfates selected from the group consisting of calcium, sodium, magnesium, and potassium sulfates; and, as a relatively minor ingredient, an effective amount of ammonium sulfate to render the composition substantially at least as effective a fire-retardant for cellulosic materials as is solely boric acid.

2. The invention of claim 1, wherein an alkaline material is included as another relatively minor ingredient in intimate association with the other ingredients to render the compostion substantially neutral in pH.

3. The invention of claim 2, wherein one or more corrosion inhibitors are intimately mixed with the other ingredients as minor constituents of the composition.

4. The invention of claim 1, wherein the reaction product is present from about 90% to about 60% by weight of the composition, and the ammonium sulfate is present from about 10% to about 40% by weight of the composition.

5. The invention of claim 1, wherein the reaction product is present from about 85% to about 75% by weight of the composition, and the ammonium sulfate is present from about 15% to about 30% by weight of the composition.

6. The invention of claim 1, wherein for every 2000 pounds of the composition of matter, there are about 1,413 pounds of the reaction product, about 400 pounds of the ammonium sulfate, about 174 pounds of hydrated lime, and about 13 pounds of corrosion inhibitors.

7. A fire-retardant cellulosic material, comprising cellulosic material treated with the fire-retardant composition of matter of claim 1.

8. The invention of claim 7, wherein the cellulosic material is finely divided waste paper intimately mixed with the fire-retardant composition of matter.

9. The invention of claim 7, wherein the cellulosic material is cotton batting.

10. A method of rendering cellulosic materials, such as cotton batting and ground waste paper insulation, fire-retardant, comprising applying to said materials the fire-retardant composition of claim 1 in quantities of from about 15% to about 30% by weight.

* * * * *